Patented Feb. 18, 1941

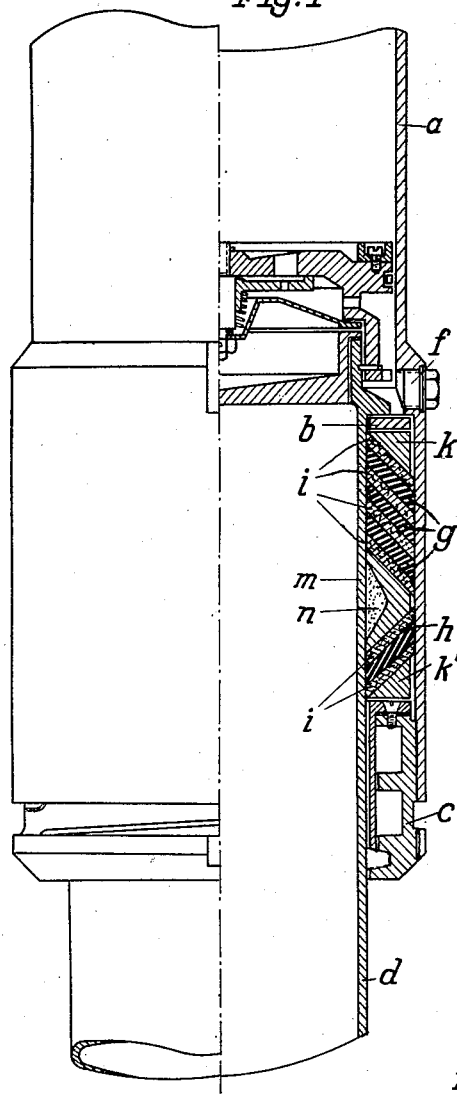
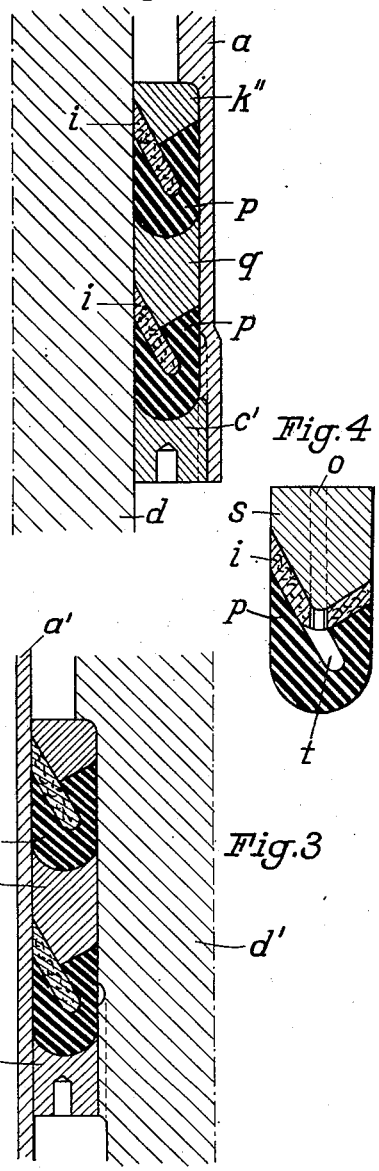

2,232,293

UNITED STATES PATENT OFFICE 2,232,293

STUFFING BOX PACKING

Eduard Toennies, Frankfort-on-the-Main, Germany, assignor to Vereinigte Deutsche Metallwerke Aktiengesellschaft, Frankfort-on-the-Main, Germany Application September 14, 1937, Serial No. 163,859
In Germany January 20, 1937

2 Claims. (Cl. 286—26)

This invention relates to a stuffing box packing, and more particularly to a stuffing box packing composed of annular ribs, such as is used between cylinder and piston or piston rod as a packing member. Relatively great demands are occasionally made on such packings, for example in pneumatic or oil spring struts in aircraft construction where the compressed air or oil under pressure has to be completely sealed under very high pressure for a long period of time, in contradistinction to cases of sealing for short periods as used, for example, in compressors or power engines. Moreover the requirement is made of resilient struts used in aircraft construction that the friction between the packing and the moving member be kept as small as possible.

For this reason it has been suggested that the annular stuffing box ribs for such packings be made of a substance such as rubber or of rubber with a fabric insert. The rubber rings are known to possess the property of arranging themselves resiliently around the guide rod and at the same time displaying a relatively low coefficient of friction through the help of a suitable lubricant. It has been found, however, that—particularly in the cause of very high pressures—the individual rubber rings do not function in the desired manner because even after a short period of operation the set of rings acting as the stuffing box becomes compressed to form a single block of rubber thus destroying the effect achieved by the arrangement of individual rings. In addition, the rings remotest from the point of introduction of the lubricant are imperfectly lubricated by such an arrangement. The first rings themselves seal up the lubricant, so that the badly lubricated rings wear rapidly and the coefficient of friction is greatly increased.

Attempts have been made to eliminate these defects by inserting metal ribs between the individual rubber rings, thus certainly ensuring division into individual annular ribs but not preventing the faulty lubrication. In order now to obtain good lubrication the further suggestion was made that the dividing surfaces of the annular ribs be provided with annular air gaps, for the reception of the lubricant, for each of the packing rings. But this method of construction also did not fulfill its purpose, since the rings were so compressed and deformed by the high working pressure that the annular gaps provided disappeared and the lubricant once again was able to reach only the first packing ring. Even special lubricant supply channels provided on the individual rings could not overcome this drawback.

According to the present invention use is now made of rubber rings with intermediate rings of a material that has the property of absorbing or storing a certain quantity of lubricant and of yielding up same for the lubrication of the rubber ring lying adjacent thereto. Leather or the like is particularly suited as such a storage material.

In order more clearly to understand the invention, reference is made to the accompanying drawing, which illustrates diagrammatically and by way of example, several embodiments thereof, and in which—

Fig. 1 shows a resilient pneumatic leg or strut, half in longitudinal section, the strut being in the unstressed position.

Figs. 2 and 3 show the packing in the form of a so-called lip sleeve, in different arrangements, while Fig. 4 shows a further cross-sectional form for the annular ribs and the support rings.

The cylinder $a$ enclosing the pressure air carries the collar ring $b$ with the screw-in guide bush $c$. Between the latter and the collar ring $b$ is situated the actual stuffing box, which seals the cylinder chamber against the piston rod $d$. The aperture $f$, closed by a screw, is the point of introduction of the lubricant, which spreads over the whole stuffing box to a low depth.

As can be seen from the drawing, the individual rubber rings $g$ and $h$ are, in identical fashion, in the shape of hollow cones. The intermediate rings $i$, which store the lubricant, are naturally of the same shape. In the embodiment illustrated, the whole stuffing box consists of two groups of such rings, each group having its conical surface running in the opposite direction to those of the other, while the closure or collar ring $b$ and the guide bush $c$ have similarly shaped rings $k$ and $k'$ respectively mounted in front of them, said rings consisting of a material retaining its shape, while between the two groups is inserted a correspondingly shaped ring $m$ in the form of a double cone. Said intermediate ring $m$ is likewise of a material retaining its shape, i. e. metal or the like, and forms in conjunction with the part $d$ to be sealed an annular lubricant chamber $n$.

In order also to use the principle of the invention advantageously in so-called lip sleeves, which represent a particular form of stuffing box packings, the annular rib storing the lubricant is mounted in front of each lip of a lip sleeve.

Through the alternate arrangement of packing and storage rings, a perfect packing, able to withstand the most severe conditions, is also obtained in this case.

In Fig. 2 $a$ is once again the cylinder part and $d$ the piston rod. The packing consists of the lip sleeves $p$, the leather ribs $i$ and the intermediate shaped ring $q$, together with the end ring $k''$, held by the threaded guide ring $c'$.

As in the case of the packing illustrated in Fig. 1, the packing rings may conversely, depending on requirements, be carried equally successfully by the inner part, while the inner surface of the outer portion, i. e. the cylinder, slides over the packing.

Such an embodiment is shown in Fig. 3, in which the packing is held by the correspondingly shaped piston rod $d'$ by means of the annular nut $r$, while the cylinder $a'$ slides.

It is not absolutely necessary that the gap in the somewhat U-shaped lip sleeve should be completely occupied by the leather ring $i$. The leather ring $i$, as shown in Fig. 4, may for example have a cross-section of angular profile, lying against the support ring $s$, so that the annular gap $t$ enclosed by the lip sleeve remains free and can be filled with the lubricant. For this purpose the support ring $s$ may have one or more bores $o$ which conduct the lubricant through the leather rings into the annular gap.

I claim:

1. A stuffing box or like assembly comprising telescoped coaxial relatively reciprocable piston and cylinder members having radially spaced concentric surfaces defining an annular packing space, axially spaced abutments carried by one of said members defining the ends of the packing space, a packing disposed in said space between said abutments and contacting the other member, said packing comprising a substantially unyielding ring element disposed intermediate said abutments having a cylindrical face in sliding engagement with the said other member and having a lubricant storage channel in said face, said unyielding ring element having substantially frustoconical walls extending from said cylindrical face toward the said member carrying said abutments, and a group of alternated substantially frustoconical rubber and oil absorbent leather packing rings disposed between said unyielding ring element and each of said abutments, said groups being oppositely obliquely disposed with the respective rings thereof in nested contacting relation and all of said rings in each group having a lateral edge in sliding sealing engagement with said other member.

2. A stuffing box packing for sealing and lubricating the joint between a piston rod member and a cylinder member containing a fluid that is subjected to high pressure upon movement of the piston with respect to the cylinder, said packing comprising a plurality of separable rings formed respectively of soft rubber and oil-absorbent leather, each having a cylindrical surface for engagement with a cylindrical joint surface of one of said members, and means for exerting axial pressure on said rings to force the cylindrical surfaces thereof into sealing engagement with said cylindrical joint surface, each of said rubber rings having a frusto-conical surface which forms one wall of an annular pocket extending into that ring from one side thereof, and said leather rings each being seated in a pocket in a rubber ring and having a frusto-conical surface contacting the frustoconical surface of the associated rubber rings, said rubber rings each having an oil recess opening into the pocket of that ring and said leather rings each having a passage opening into the oil recess of the associated rubber ring, whereby said leather rings supply oil to said cylindrical joint surface and said cylindrical surfaces of the rubber rings for lubricating the same upon movement of the piston rod.

EDUARD TOENNIES.